United States Patent [19]

Snyder

[11] Patent Number: 4,613,087

[45] Date of Patent: Sep. 23, 1986

[54] SCRAP TIRE CUTTING APPARATUS

[75] Inventor: Robert H. Snyder, Grosse Pointe Park, Mich.

[73] Assignee: Uniroyal Tire Company, Inc., Middlebury, Conn.

[21] Appl. No.: 504,017

[22] Filed: Jun. 13, 1983

[51] Int. Cl.$^4$ .............................. B02C 19/12
[52] U.S. Cl. .................................... 241/111; 83/346; 241/159; 241/DIG. 31
[58] Field of Search ............... 241/101.4, 111, 112, 241/120, 121, 159, 230–236, DIG. 31; 83/342, 346, 347, 505, 408, 659, 519, 425.2, 425.3, 435.2

[56] References Cited

U.S. PATENT DOCUMENTS

| | | |
|---|---|---|
| 202,553 | 4/1878 | Knoth . |
| 356,603 | 1/1887 | Shirk ............................ 241/159 |
| 1,183,573 | 5/1916 | Le Page . |
| 1,183,574 | 5/1916 | Le Page . |
| 1,709,018 | 4/1929 | Howson ........................ 241/111 |
| 2,121,453 | 6/1938 | Sundstrand . |
| 2,130,983 | 9/1938 | Kohler ........................... 241/111 |
| 2,370,129 | 2/1945 | Asbill, Jr. et al. . |
| 3,380,328 | 4/1968 | Martin ......................... 83/347 X |
| 3,502,276 | 3/1970 | Panning et al. ............... 241/111 |
| 3,578,252 | 5/1971 | Brewer .......................... 241/141 |
| 3,630,460 | 12/1971 | Goldhammer ................ 241/236 |
| 3,656,697 | 4/1972 | Nelson .......................... 241/222 |
| 3,727,850 | 4/1973 | Krigbaum ..................... 241/159 |
| 3,817,463 | 6/1974 | Krigbaum ..................... 241/152 R |
| 3,931,935 | 1/1976 | Holman ........................ 241/24 |
| 4,074,599 | 2/1978 | Allen ............................. 83/346 |
| 4,081,143 | 3/1978 | Johnson et al. ............... 241/29 |
| 4,180,004 | 12/1979 | Johnson ........................ 110/346 |
| 4,338,839 | 7/1982 | Farrel, Sr. et al. ............ 83/620 |
| 4,338,840 | 7/1982 | Farrel, Sr. et al. ............ 83/622 |

FOREIGN PATENT DOCUMENTS 2315171 10/1974 Fed. Rep. of Germany ........ 83/346

Primary Examiner—Mark Rosenbaum
Attorney, Agent, or Firm—Jack Posin; Donald W. Walk

[57] ABSTRACT

An apparatus for cutting scrap tires and other waste products is disclosed. The apparatus includes a frame having a cylindrical anvil roll rotatably mounted therein. A pair of blade rolls are also mounted in the frame for rotation about corresponding axes which are parallel to the rotational axis of the anvil roll, the blade rolls being angularly spaced from one another relative to the axis of the anvil roll and being positioned about the periphery of the anvil roll. The blade rolls are each provided with a plurality of blades of predetermined diameter fixed thereto and rotatable therewith, the blades of one blade roll being at a low angle to the axis of that roll and the blades of the other blade roll being at a high angle to the axis of that roll, so that a tire passing between both blade rolls and the anvil roll will be cut into rhomboidal pieces that are nearly rectangular in shape during a single pass through the apparatus. The blade rolls are each also provided with a pair of axially spaced thrust wheels, with the thrust wheels being positioned outboard of the blades and being equal to or slightly greater in diameter than the predetermined diameter of the blades. Driving means are provided in the apparatus for rotating the anvil roll in one direction and the blade rolls in an opposite direction. Biasing means are also provided for forcing the outer peripheries of the thrust wheels and the anvil roll into hard contact with one another thereby to maintain fixed the spacing between the cutting surfaces of the blades and the outer surface of the anvil roll notwithstanding the separating forces caused by the movement of a tire between such surfaces.

31 Claims, 10 Drawing Figures

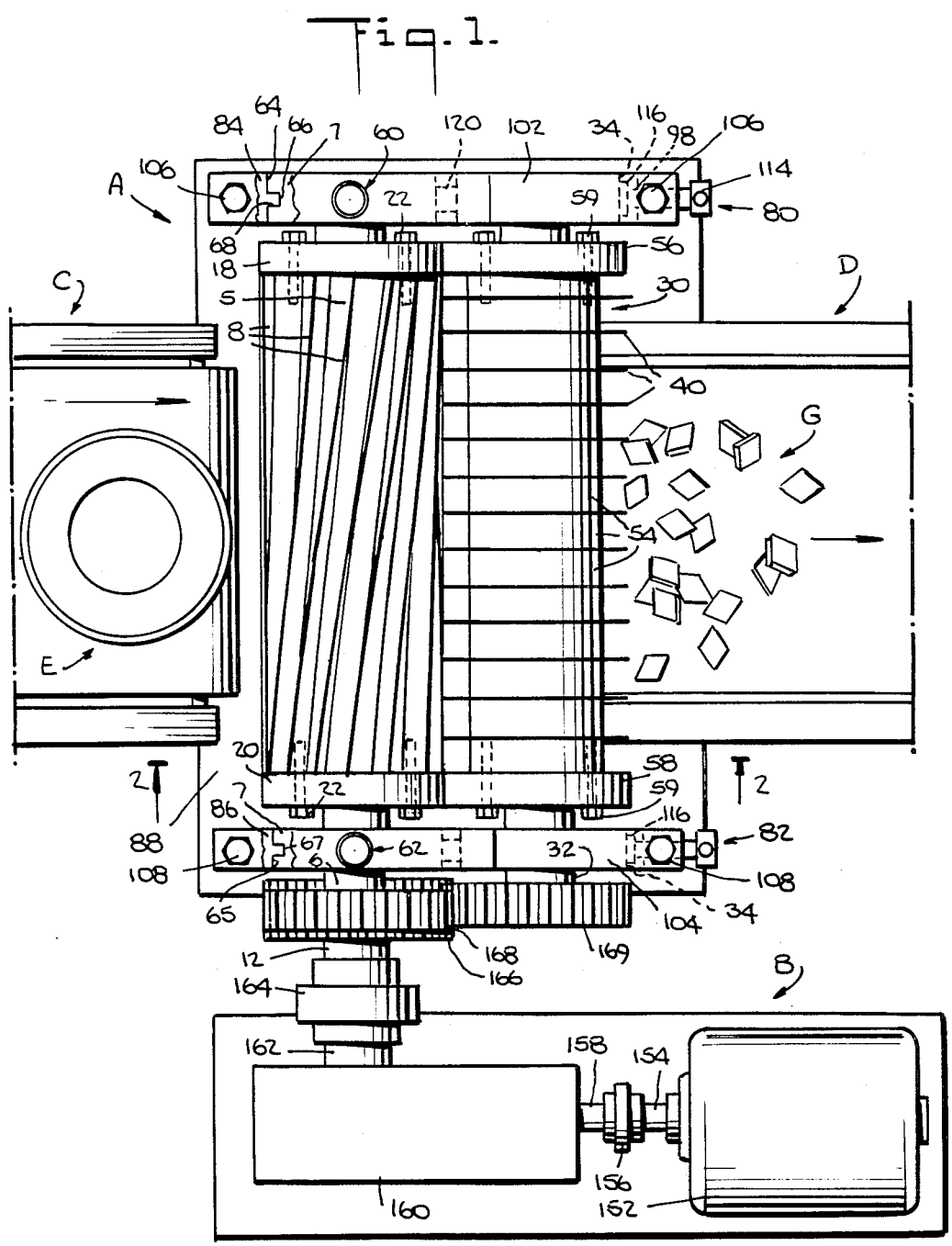

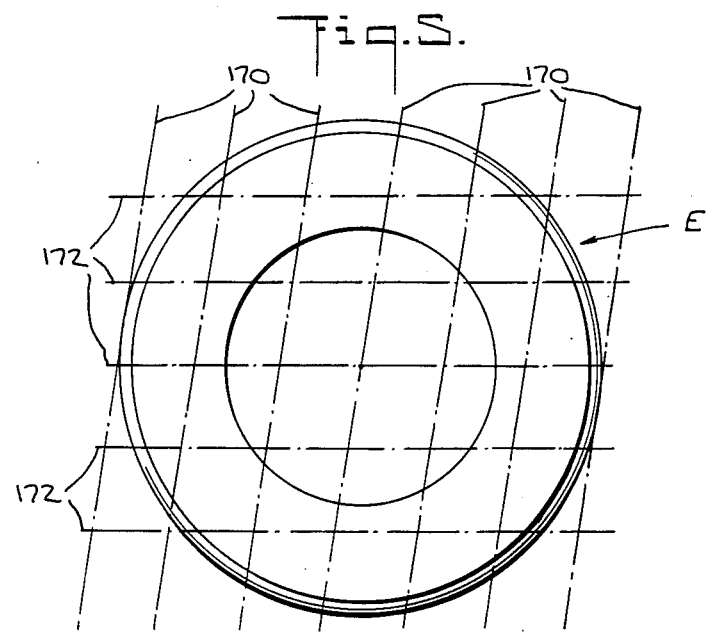
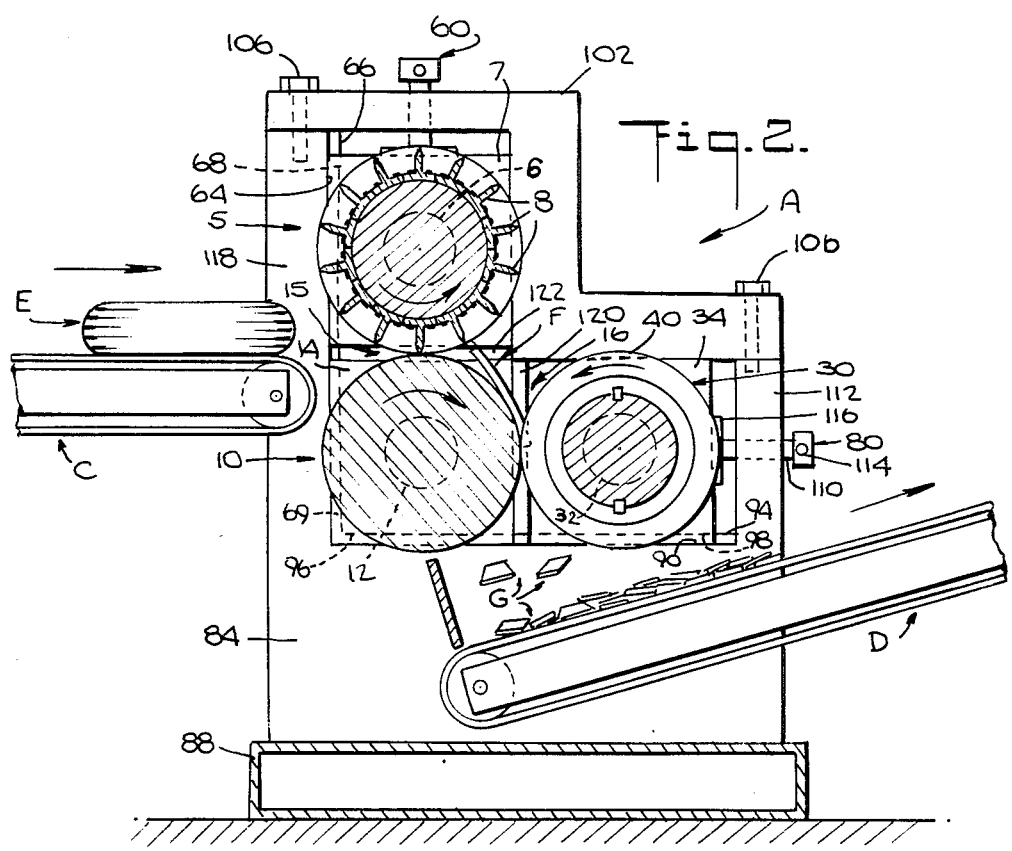

SCRAP TIRE CUTTING APPARATUS

This invention relates to tire cutting apparatus and, more particularly, to an apparatus for cutting scrap rubber tires into small pieces for disposal. It is an improvement to the invention described and claimed in the copending application of applicant and Eric O. Tolonen, Ser. No. 493,400, filed May 10, 1983, and assigned to the assignee of the present invention.

BACKGROUND OF THE INVENTION

The era of the automobile has brought about significant environmental problems, one of which is represented by the ever increasing accumulation of scrap tires requiring disposal. Various proposals have been set forth for reducing or eliminating the accumulation of scrap tires such as, for example, reclaiming of the rubber in the tires in power plants, and burying of the tires in conventional dumps and landfills.

Reclaiming of the rubber in the tires for further use as a raw material and burning of the rubber in the tires to generate power represent preferred ways of disposing of scrap tires since they recapture much of the energy originally consumed in the manufacture of the tire. However, as a necessary first step to either reclaiming the tires or burning them, the tires must be cut up into smaller pieces (e.g., rectangular chunks of 3 to 4 inches length on each side) which can be subsequently processed.

Similarly, even where tires are disposed of by burying in dumps or landfills, it is necessary to cut the old tires up into smaller pieces before burying in order to prevent the tires from working their way to the surface over a period of time.

Heretofore various proposals have been made for cutting scrap tires into small pieces, and various commercial models of tire cutting machines and shredders are available on the market. Among these devices are simple shearing mechanisms, in which one sharp-edged blade moves past another in a simple scissor action (for example, as shown in U.S. Pat. Nos. 3,578,252 to J. C. Brewer, 4,338,839 to W. M. Farrell, Sr, et al. and 4,338,840 to W. M. Farrell, Sr., et al.). Other such devices include rotary cutting apparatus wherein one set of shearing edges affixed to a rotor moves past mating, interleaved, rotary edges affixed to another, counterrotating, parallel rotor forming a rotary scissors (as shown for example in U.S. Pat. Nos. 3,656,697 to D. J. Nelson, 3,727,850 to C. A. Krigbaum and 3,931,935 to M. A. Holman). A third type of commercially available tire cutting machine is one in which rotary cutter blades and corresponding rotary anvils rotate in face-to-face contact with each other to cut the tires therebetween (as shown in U.S. Pat. Nos. 3,817,463 to C. A. Krigbaum, 4,081,143 to A. O. Johnson et al. and 4,180,004 to A. O. Johnson).

Tire cutting devices of the type employing either the simple scissor-blade shearing action or the rotary scissor-blade shearing action, while satisfactory for cutting up thin rubberized or plastic-coated textile sheet materials, are relatively much less satisfactory for cutting heavy vulcanized tires which are assemblies of rubber, wires and cords. One reason for this is that the heavy reinforced rubber resists cutting and develops forces as a result of the shear stress, which forces tend to separate the shearing blades. The separated blades then trap rubber between them and the rubber exerts heavy frictional forces against further passage of the blade.

Thus, cutting devices based on shearing blades (both simple and rotary) can operate effectively only when the blades are sharp-edged and when tight clearances between paired blades are maintained. However, with continued use blade edges dull, tend to separate and then drag rubber between them. The separation thus produced defeats the shearing action and enormously intensifies the energy requirements needed to complete the cut. In practice the frictional forces encountered may be so high as to stop the motor or break the machine. As a result, such machines commonly have clutches or reversing gears to allow removal of the entrapped tire portions and permit a fresh cut. At best, the power requirements are very high when tire cutters of this type are employed.

An additional difficulty with tire cutters of this sort is that they fail to shear cleanly the textile cords or wires in the tires and, instead, strip rubber from such members and rupture the cords or wires by tensile breaks. The chopped pieces are then characterized by having projecting filaments of cord or wire that may extend out four or more inches from the rubber chunk. In some cases whole lengths of wire may be torn from the tire with minimal amounts of rubber attached. Chopped up tire pieces, characterized in this way, are considered unsuitable for a number of commercial uses for which cleanly chopped pieces of tire can be used.

Tire cutting machines employing cooperating rotary blades and rotary anvils represent an improvement over the simple scissor-type blade cutters and the rotary scissor-type blade cutters in that they are capable of cleanly cutting the tire carcass with low power demands and without exposure of significant amounts of projecting wire or cord.

Known forms of rotary blade/rotary anvil types of tire cutters have not been entirely satisfactory for a number of reasons. One reason is that the high compression and close blade approach required to cut tires between a rotary blade and a rotary anvil is difficult to attain and maintain due to bearing slack in the bearings supporting the rolls carrying the blades and anvils. Another reason is that in attempting to avoid the problems due to bearing slack, the rotary blades and anvils have been put into hard, pressing contact with one another, causing excessive wear on both the blades and the anvils and necessitating frequent maintenance at high costs. Alternatively, to cope with the bearing slack problem, stationary tear strip members have been employed adjacent to the rotary blades and anvils, allowing rubber to become trapped between the moving and stationary parts and thereby significantly increasing the power requirements of such devices. Yet another problem associated with the rotary blade/rotary anvil types of tire cutters relates to the design of the specific cutting edges employed on the blades, in that such blades have heretofore not been designed in such a manner as to provide long service wear and improved cutting ability.

In the aforesaid copending application Ser. No. 493,400, an improved rotary blade/rotary anvil type of tire cutting apparatus is disclosed in which hard pressing contact between the knife edges of the rotary blades and the anvil roll is avoided but in which a high force is exerted tending to keep the blades and anvils together to prevent separation of the rolls to the point where the blades will no longer cut the tires. In said copending application the invention comprises a frame having a cylindrical anvil roll rotatably mounted therein. A blade roll is also mounted in the frame for rotation about an axis parallel to the rotational axis of the anvil roll, and a plurality of axially spaced roller blades of predetermined diameter are fixed to the blade roll and rotatable therewith. The blade roll is also provided with a pair of axially spaced thrust wheels, with the thrust wheels being positioned outboard of the blades and being equal to or slightly greater in diameter than the predetermined diameter of the blades. Driving means are provided in the apparatus for rotating the anvil roll and the blade roll in opposite directions in such a manner that scrap tires fed to the rolls from one side thereof (e.g., above) will be drawn inwardly (e.g., downwardly) by and be cut between the blades and the anvil. Biasing means are also provided for forcing the outer peripheries of the thrust wheels and the anvil roll into hard contact with one another to thereby maintain a predetermined positional relationship between the cutting surfaces of the blades and the outer surface of the anvil notwithstanding the separating forces caused by the movement of a tire between such surfaces.

By an arrangement of the type described in said copending application, the contact between the thrust wheels and the anvil ensures that the blades are at all times in proper cutting relation to the anvil surface without scoring of the anvil surface and without the blades becoming dulled through excessive contact pressure. Moreover, the power requirement is held to a minimum and effective, economic cutting of scrap tires into small pieces is achieved.

The tire cutting apparatus of said copending applifcation, while effective for cutting scrap tires, requires two passes of the tire to be made through the cutting apparatus. In the first pass therethrough the tire is cut into strips by the roller blades and anvil roll thereof, and in the second pass the strips are cut into generally rectangular pieces. This arrangement requires additional conveying equipment to be employed in conjunction with the cutting apparatus to recycle the strips through the cutting assembly and involves a time consuming repeat-cycle operation to be employed in connection with each scrap tire being cut up. Moreover, if it is desired to cut the tires into pieces to meet a prescribed size range, elaborate screening systems must be set up to classify the tire pieces.

OBJECTS OF THE INVENTION

It is, therefore, a primary object of this invention to provide an improved apparatus for cutting scrap tires and other cured rubber products into small pieces.

It is a further object of this invention to provide an improved tire cutting apparatus that can cut scrap tires into small pieces of prescribed size during a single pass of the tires therethrough and, thus, at a faster rate than has heretofore been the case.

Yet another object of this invention is to provide improved tire cutting apparatus that requires fewer and less expensive auxiliary equipment to operate in conjunction with it than earlier known forms of scrap tire cutting apparatus.

Further objects and advantages of this invention will become apparent as the following description proceeds.

BRIEF DESCRIPTION OF THE INVENTION

Briefly stated and in accordance with one embodiment of this invention, improved apparatus for cutting scrap tires and other waste products comprises a frame having a cylindrical anvil roll rotatably mounted therein. A pair of blade rolls are also mounted in the frame for rotation about corresponding axes which are parallel to the rotational axis of the anvil roll, the blade rolls being angularly spaced from one another relative to the axis of the anvil roll and being positioned about the periphery of the anvil roll. The blade rolls are each provided with a plurality of blades fixed thereto and rotatable therewith, the blades of one blade roll being at a low angle to the axis of that roll and the blades of the other blade roll being at a high angle to the axis of that roll, so that a tire passing between both blade rolls and the anvil roll will be cut into rhomboidal pieces that are nearly rectangular in shape during a single pass through the apparatus.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

FIG. 1 is a plan view, with portions cut away for clarity, of a preferred scrap tire cutting apparatus in accordance with this invention;

FIG. 2 is a side elevation view, with portions cut away for clarity, of the scrap tire cutting apparatus of FIG. 1, taken along the line 2—2 of FIG. 1;

FIG. 5 is a plan view of a scrap tire having broken lines superimposed thereon to illustrate the manner in which the tire is cut into nearly rectangular rhomboidal pieces after passing through the tire cutting apparatus of FIG. 1;

DETAILED DESCRIPTION OF THE INVENTION

Figure 3:
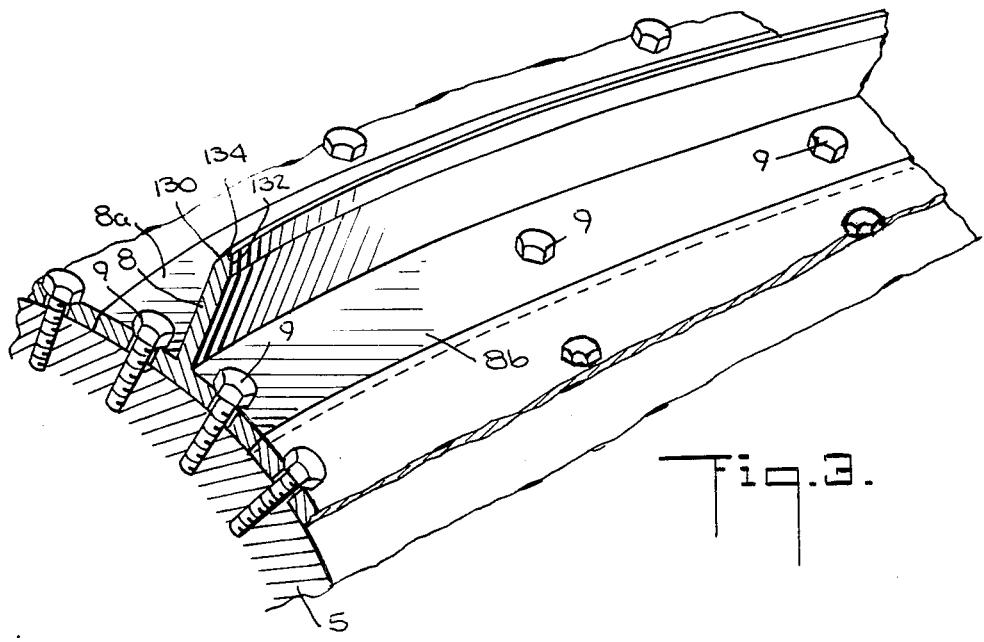
FIG. 3 is an enlarged perspective view of a portion of one of the low angle blades on the upper blade roll of the tire cutting apparatus of FIG. 2.

Referring to the drawings, in which like reference numerals are used to denote like features in the different views, this specification will now continue with a general description of the scrap tire cutting apparatus, having reference to FIGS. 1 and 2, and then will follow with a detailed description of the apparatus, having reference both to FIGS. 1 and 2 and to the remaining figures of the drawings.

As may be seen in FIGS. 1 and 2, the scrap tire cutting apparatus comprises a cutting assembly A, including a first or upper blade roll 5, an anvil roll 10, and a second or lower blade roll 30, at which the scrap tires are cut into pieces; a drive mechanism B for driving the rotating components of the cutting assembly A; a first conveying means C for delivering scrap tires to the cutting assembly A; and, a second conveying means D for removing pieces of scrap tire which have been cut by the cutting assembly A and discharging them from the apparatus.

In operation of the apparatus, scrap tires E from a suitable source or stock pile (not shown) are loaded on to the upstream end of the first conveying means C and are fed to the cutting assembly A. In the cutting assembly A, the scrap tires E are first cut into large strips F of scrap tire, between the first blade roll 5 and the anvil roll 10, and are then cut into small pieces G of scrap tire, between the second blade roll 30 and the anvil roll 10. The small pieces G then drop onto the second conveying means D, which provides a continual output of small pieces G at its downstream end.

Referring more particularly now to FIGS. 1–4, the cutting assembly A will now be described in greater detail. Cutting assembly A includes the aforementioned rotatably mounted cylindrical anvil roll 10 which is integral with or fixedly carried by a shaft 12 that is supported in bearings carried in bearing boxes 14 positioned at opposite sides of the anvil roll 10.

The cutting assembly A also includes the aforementioned first rotatable blade roll 5 which is carried by a shaft 6 that is rotatably supported in bearing boxes 7 positioned at opposite sides of the blade roll 5. Blade roll 5 is provided with a plurality of helical roller blades 8 having circumferentially extending flanges 8a, 8b formed integrally therewith (FIG. 3). The roller blades 8 are fixedly mounted on blade roll 5, for example by bolts 9 which are screwed into tapped holes by known lock thread arrangements, to insure that they do not work loose during operation of the apparatus. Preferably, the roller blades 8 are fixed to the blade roll 5 at a very low helix angle with reference to the roll axis, for example 10°, to facilitate the grasping of incoming tires by and the feeding of such tires into a first nip 15 between blade roll 5 and anvil roll 10. The low angle of roller blades 8 also insures that the strips of scrap tire cut therein will present themselves in a favorable position (nearly horizontal) with regard to entry into a second nip 16 between the second blade roll 30 and the anvil roll 10.

Blade roll 5 is also provided with a pair of axially spaced thrust wheels 18, 20, one of which is located adjacent each of the outboard ends of the blade roll. Each of the thrust wheels 18, 20 is fastened to blade roll 5, for example by bolts 22, to insure that the thrust wheels rotate in unison with blade roll 5.

The cutting assembly A also includes the aforementioned second rotatable blade roll 30 which is carried by a shaft 32 that is rotatably supported in bearings carried in bearing boxes 34 positioned at opposite sides of the blade roll 30.

Blade roll 30 is provided with a plurality of axially spaced, disc-shaped, annular roller blades 40. Preferably, the roller blades 40 are fixed to the blade roll 30 at a high angle with reference to the roll axis, for example 90°, so that the large pieces F of scrap tire which arrive at the nip 16 between this roll and anvil roll 10 in a horizontal or nearly horizontal position will be cut into rectangles or into rhomboids closely approaching rectangular shape.

Figure 4:
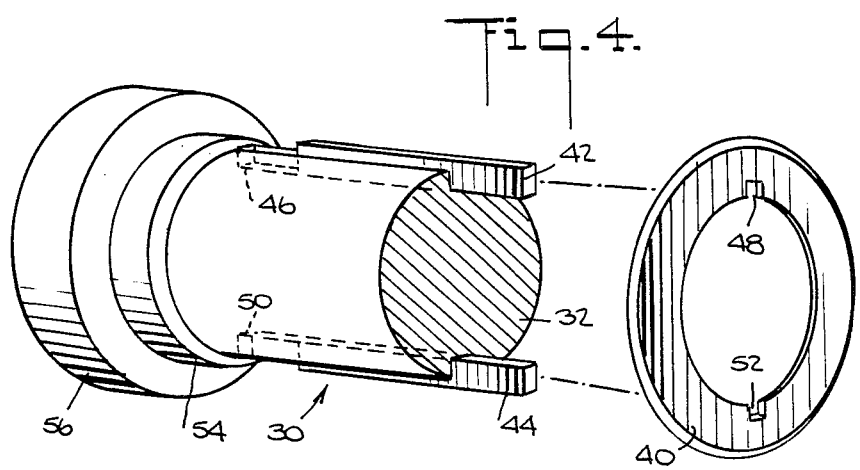
FIG. 4 is a perspective view of a portion of the lower blade roll of FIG. 2, showing the manner in which the high angle roller blades are assembled to the cylindrical core of that blade roll.

In accordance with the foregoing, the roller blades 40 are keyed to the shaft 32 for rotation therewith by means of keys 42, 44 (FIG. 4). Key 42 fits into a keyway 46 formed in the shaft 32 and engages a keyway 48 cut into the inner periphery of each of the roller blades 40. Similarly, key 44 fits into a keyway 50 on shaft 32 located 180° apart from keyway 46 and engages a keyway 52 cut into each of the roller blades 40 at the inner peripheries thereof located 180° apart from the keyways 48. The various roller blades 40 are axially separated from one another by annular collars 54, each of which is provided with suitable keyways (not shown) corresponding to the keyways 48 and 52 in the roller blades 40, at 180° circumferentially spaced locations on its inner periphery.

Figure 9:
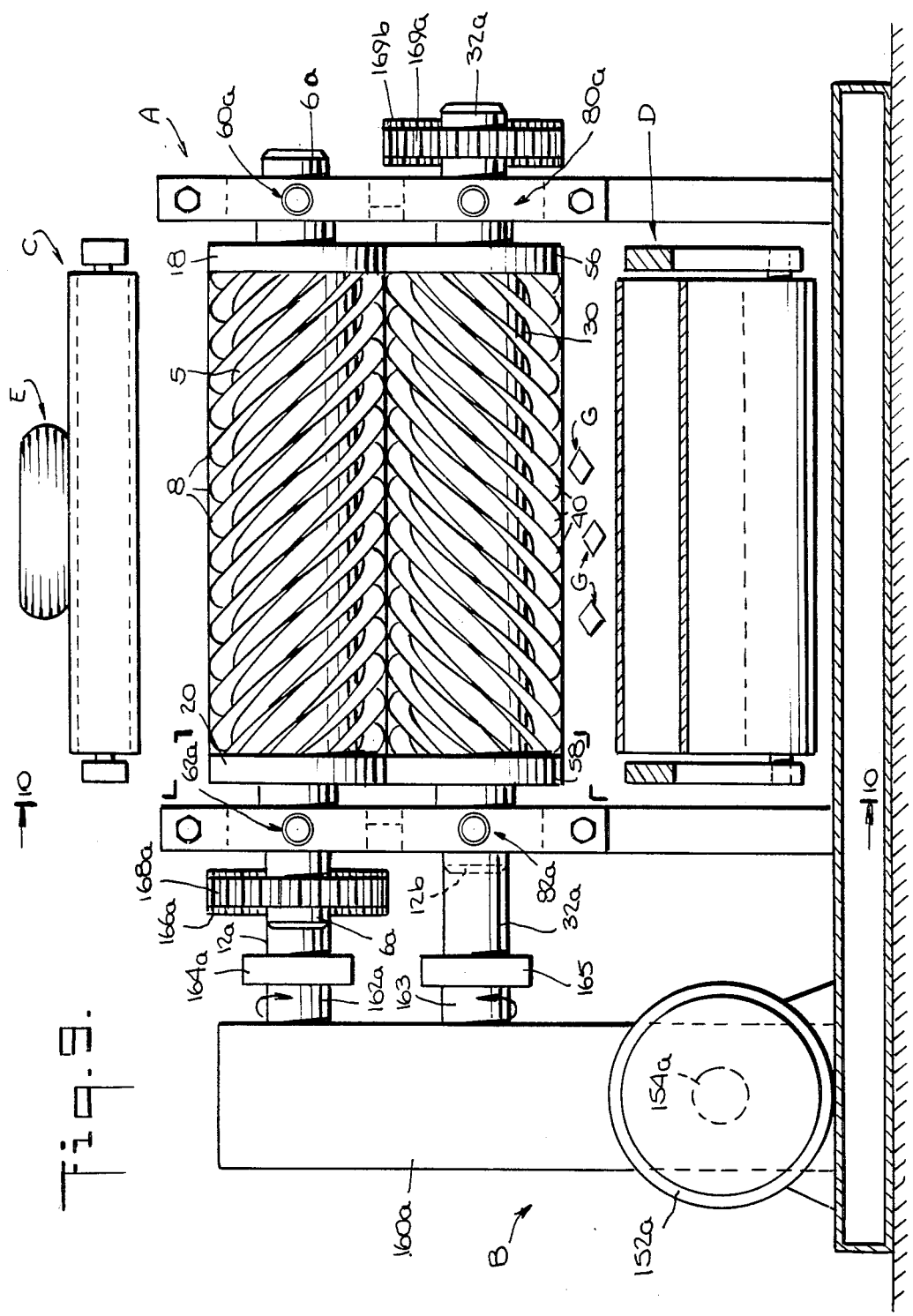
FIG. 9 is a front elevation view, with portions cut away for clarity, of an alternate embodiment of a scrap tire cutting apparatus in accordance with this invention; and, FIG. 10 is a side elevation view of the scrap tire cutting apparatus of FIG. 9, taken along the line 10—10 of FIG. 9.

An alternate arrangement for cutting the scrap tires into generally square or rectangular pieces would involve providing both the first blade roll 5 and the second blade roll 30 with helical blades whose helix angles are complementary to one another, or nearly so. Thus, the helical roller blades of blade roll 5 in this embodiment would be at 45° to the roll axis of that blade roll and of one hand, while the helical roller blades of the blade roll 30 would be at 45° to the roll axis of that blade roll and of opposite hand, as shown in FIG. 9 in connection with another embodiment of this invention. Other suitable combinations of complementary or substantially complementary blade helix angles are also contemplated by this invention, with the blade helix angle on one blade roll preferably being between 0° and less than 45° (i.e., at a low angle relative to the axis of that blade roll) and of one hand when greater than 0°, and the blade helix angle on the other blade roll preferably being between greater than 45° and 90° (i.e., at a high angle relative to the axis of that blade roll) and of opposite hand when less than 90°.

The blade roll 30 is also provided with a pair of axially spaced thrust wheels 56, 58 (FIG. 1), one of which is located adjacent each of the outboard ends of the blade roll. Each of the thrust wheels 56, 58 is fastened to blade roll 30, for example by bolts 59, to insure that the thrust wheels rotate in unison with the blade roll 30.

In order to insure that scrap tires which are to be cut by the cutting assembly A will be cut cleanly over a long period of time and without causing scoring of the anvil roll or damage to the roller blades, the diameters of the thrust wheels 18, 20 and 56, 58 are made at least equal to or slightly greater in diameter than the diameters of the corresponding roller blades 8 and 40, each of which is of the same diameter as the others on the corresponding blade rolls 5 and 30. Preferably, the thrust wheels 18, 20 and 56, 58 will be in the range of 0.001 in. to 0.003 in. greater in diameter than the corresponding roller blades 8 and 40. In addition, biasing means, shown generally at 60 and 62 in the case of blade roll 5, and at 80 and 82 in the case of blade roll 30, are employed to press the respective thrust wheels 18, 20 and 56, 58 of the blade rolls into hard contact with the surface of the anvil roll 10. This arrangement maintains a predetermined positional relationship between the peripheral surfaces of the roller blades and the peripheral surface of the anvil roll notwithstanding the separating forces generated therebetween due to the movement therethrough of scrap tires being cut between such surfaces. Such separating forces can add about 0.020 in. of separation between the roller blades at the central portions of blade rolls 5 and 30 and the anvil roll 10, due to bending of the rolls 5, 10 and 30; however, this is acceptable and does not significantly interfere with the proper cutting action of cutting assembly A in accordance with the principles of this invention.

Referring more particularly to FIGS. 1 and 2, the bearing boxes 14 of anvil roll 10 and the bearing boxes 7 and 34 of respective blade rolls 5 and 30 are supported in upstanding pedestals 84, 86 carried by a base plate 88 which, together with the upstanding pedestals 84, 86, forms the frame for the cutting mechanism A. The rear (as viewed in FIG. 2) bearing box 14 of anvil roll 10 and the rear bearing box 34 of blade roll 30 are horizontally adjustably positioned in a cut-out portion or slide 90 of pedestal 84, while the front bearing box 14 of anvil roll 10 and the front bearing box 34 of blade roll 30 are horizontally adjustably positioned in a similar cut-out portion or slide (not shown) of pedestal 84.

In order to prevent side-wise or axial movement of the bearing boxes 14 and 34 with respect to pedestal 84, the slide 90 thereof is provided with a raised rib 94 (FIG. 2) which is engaged by mating profiled grooves 96 and 98 in bearing boxes 14 and 34, respectively, and the corresponding slide (not shown) of pedestal 86 (FIG. 1) is provided with a similar raised rib (not shown) that is engaged by similar grooves (not shown)in the corresponding bearing boxes 14 and 34 thereof.

Pedestal caps 102 and 104 are positioned atop the pedestals 84 and 86, respectively, to prevent the bearing boxes 34 from moving vertically to any significant degree at their adjusted positions on slides 90. Pedestal cap 102 is fastened to pedestal 84 by means of hold-down bolts 106, and pedestal cap 104 is fastened to pedestal 86 by means of similar hold-down bolts 108. The vertical spacing between the upper surface of slide 90 (FIG. 2) and the lower surface of pedestal cap 102 is so selected as to provide about 0.002 in. of clearance between the lower surface of pedestal cap 104 and the top of bearing box 34 in order to allow the bearing box to be moved along slide 90 by the biasing means 80 when hold-down bolts 106 have been tightened down. A similar spacing arrangement is employed between pedestal cap 104 and the corresponding slide of pedestal 86, for similar reasons.

A somewhat similar arrangement of parts is employed in connection with vertically adjusting the bearing boxes 7 of blade roll 5 and the bearing boxes 14 of anvil roll 10. Thus, the rear (as viewed in FIG. 2) bearing box 7 of blade roll 5 and the rear bearing box 14 of anvil roll 10 are vertically adjustably positioned in a cut-out portion or slide 64 of pedestal 84, while the front bearing box 7 of blade roll 5 and the front bearing box 14 of anvil roll 10 are vertically adjustably positioned in a similar cut-out portion or slide 65 (FIG. 1) of pedestal 86. Similarly, slides 64 and 65 are provided with respective raised ribs 66 and 67. Rib 66 is in engagement with mating profiled grooves 68 and 69 (FIG. 2) in rear bearing boxes 7 and 14, respectively, to prevent side-wise (axial) movement of these bearing boxes in pedestal 84, and rib 67 is in engagement with corresponding mating profiled grooves in the front bearing boxes 7 and 14 to prevent side-wise movement of these bearing boxes in pedestal 86.

The pedestal caps 102 and 104 positioned atop pedestals 84 and 86, in addition to preventing the bearing boxes 34 of blade roll 30 from moving vertically to any significant degree at their adjusted positions on slides 90, also serve to prevent the bearing boxes 7 of blade roll 5 from moving horizontally to any significant degree at their adjusted positions on slides 64 and 65. In this case, referring to FIG. 2, the horizontal spacing between the surface of rear slide 64 and the inner (left-hand as viewed in FIG. 2) surface of the vertical portion of cap 102 is so selected as to also provide about 0.002 in. of clearance between such inner (left-hand) surface and the right-hand surface of bearing box 7 in order to allow the bearing box to be moved along slide 64 by the biasing means 60 when the hold-down bolts 106 have been tightened down. A similar spacing arrangement is employed between the vertical portion of pedestal cap 104 (FIG. 1) and the corresponding front slide 65, for similar reasons.

The manner in which the biasing means 80, 82 are employed to force the blade roll 30 toward the anvil roll 10 to bring the outer peripheries of the anvil roll 10 and the thrust wheels 56, 58 of the blade roll 30 into hard contact with one another will now be considered in greater detail. Only the rear biasing means 80 (FIG. 2) will be discussed in detail herein; however, it will be understood that the front biasing means 82 is constructed and arranged in a similar manner to biasing means 80 and performs similar functions with respect to the front portion (FIG. 1) of the cutting assembly A. Also, it will be understood that the biasing means 60 and 62 are constructed and arranged in similar manners to biasing means 80 and 82 and perform similar functions with respect to blade roll 5 of the cutting assembly A.

Biasing means 80 includes an adjusting screw 110 which is threadedly mounted in and passes through one (the right, as viewed in FIG. 2) leg 112 of pedestal 84. One (the right) end of screw 110 is provided with an enlarged head having an opening 114 therethrough into which a crow bar or other rod-like implement may be inserted in order to rotate screw 110 in the threaded bore of pedestal leg 112. The opposite end of screw 110 rotatably engages and carrys a pressure pad 116 which bears against bearing box 34.

In order to set up the cutting assembly A for operation, the slack in the bearings in each of the bearing boxes 14 and 34, which slack amounts to about 0.0045 in. in each of the bearings, must be taken up by the biasing means 80. This is done to prevent the roller blades 40 from moving away from the surface of anvil roll 10 when scrap tires are being cut therein, which movement would interfere with the proper cutting of such scrap tires in the cutting assembly A. The slack is taken up by turning the adjusting screw 110 to axially advance the screw 110 and pressure pad 116 against the bearing box 34. As viewed in FIG. 2, this first causes bearing box 34 to move to the left, taking the slack out of that bearing box, and then causes shaft 32 of blade roll 30 to move to the left, forcing thrust wheel 56 into hard contact with the outer periphery of anvil roll 10. Next, shaft 12 of anvil roll 10 presses against the left side of bearing box 14, taking the slack out of the bearing in that bearing box, and, finally, bearing box 14 moves to the left into hard contact with the right vertical surface of the left leg 118 of pedestal 84.

In actual practice, feeler gages (not shown) are employed in setting up the initial positioning of anvil roll 10 and blade roll 30 in the cutting assembly A. One feeler gage is positioned between the inner surface of the bearing box 34 and the shaft 32 carried therein, at the vertical level of the axis of the shaft, and another feeler gage is inserted between the inner wall of the bearing box 14 and the shaft 12, at the vertical level of the axis of shaft 12. The adjusting screw 110 is then turned to move the bearing boxes toward the left leg 118 until each of the feeler gages show that the slack of 0.0045 in. has been taken up. At that point, a third feeler gage is inserted between the two bearing boxes to measure the spacing therebetween, and then a spacer member 120, having a thickness equal to the spacing between the bearing boxes 14 and 34, is cut to size for subsequent insertion between bearing boxes 14 and 34. A similar spacer member 122 is prepared in a similar manner for subsequent insertion between the bearing boxes 7 and 14 in connection with setting up the starting position of blade roll 5 with respect to anvil roll 10.

After the spacers 120 and 122 have been prepared, the adjustment screws 110 are backed off, the various feeler gages are removed, and the spacer members 120, 122 are inserted between their corresponding bearing boxes. Then the adjusting screws 110 are re-tightened sufficiently to cause the bearing boxes 34 to be pressed into hard contact with spacer members 120, the spacer members 120 to be pressed into hard contact with the bearing boxes 14, and the bearing boxes 14 to be pressed into hard contact with the inner surface of the left legs 118 of the pedestals 84 and 86. Similarly, the bearing boxes 7 will be pressed into hard contact with the spacer members 122, which will be pressed into hard contact with the bearing boxes 14, and the latter will be pressed into hard contact with the inner surfaces of the base portions of pedestal 84. As a result of the foregoing, the thrust wheels 18 and 20 of blade roll 5 and the thrust wheels 56 and 58 of blade roll 30 will be pressed into hard contact with the outer surface of anvil roll 10, insuring that the respective roller blades 8 and 40 are properly positioned with respect to the surface of anvil roll 10 for cutting tires in the cutting assembly A.

When so properly positioned, the roller blades 8 and 40 and the outer surface of anvil roll 10 are in tangential contact, or substantially so, forming consecutive nips 15 and 16 through the first of which scrap tires E are passed and through the second of which cut strips F of scrap tires are passed during the cutting operation of cutting assembly A.

Since the slack has been removed from the bearings supporting blade rolls 5 and 30 and anvil roll 10, the preset positional relationships of the blades 8 and 10 and the anvil roll 10 are maintained during the cutting operation without separation of the blades from the anvil roll (other than by acceptable bending of the rolls) and without scoring of the anvil roll by the blades, or vice versa.

Figures 6, 7, 8:
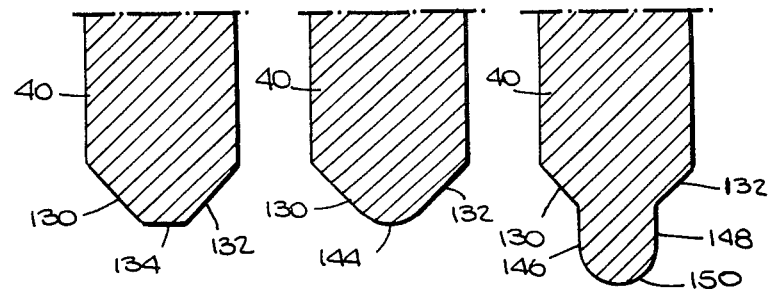
FIGS. 6-8 are enlarged detailed sectional elevational views of the outer peripheral portions of various configurations of roller blades that may be used in the scrap tire cutting apparatus of FIG. 1.

Referring now to FIG. 6, a preferred peripheral construction for roller blades 40 has been illustrated, it being understood that a similar peripheral construction is employed in connection with roller blades 8. The peripheral portions of the blades are preferably provided with inclined sides 130, 132 which are interconnected at their radially outer ends by a peripheral flat portion 134 which is in the form of a right cylinder coaxial with the rotational axis of the roller blade. The peripheral portion 134 is positioned radially inwardly of the apparent point of intersection of the inclined sides 130, 132, the arrangement being such as to form a blunt-tipped roller blade. The width of the flat portion 134 is preferably in the range of 3/64 in. to ¼ in. on roller blades having a total width of about ½ in.

The included angle between the inclined sides 130, 132 is preferably about 90° but it has been found that such included angle may be any angle greater than 60° but less than 135° and still perform satisfactorily as a roller blade in this invention.

Referring to FIGS. 7 and 8, it has been found that blades with fully rounded edges also perform well as roller blades 8 and 40. Thus, the peripheral portions of the roller blades may, as in FIG. 7, have inclined sides 130, 132 interconnected by a circular arc 144, which arc may have a radius of, for example, about ⅛ in. Similarly, the peripheral portions of the roller blades 8 and 40 may, as in FIG. 8, have inclined sides 130, 132 interconnected by short, straight-sided blade portions 146, 148 and a circular arc 150, which arc, again, may have a radius of about ⅛ in.

Referring now to FIG. 1, the drive mechanism B, which serves to rotate anvil roll 10 in one direction and blade rolls 5 and 30 in the opposite direction, will now be described in greater detail.

Drive mechanism B includes a drive motor 152 the output shaft 154 of which is coupled by means of a coupling unit 156 to the input shaft 158 of a reduction gear mechanism 160. Reduction gear mechanism 160 includes an output shaft 162 which is coupled by means of a coupling unit 164 to the shaft 12 of anvil roll 10. Shaft 12 carries a gear 166 keyed thereto so that gear 166 rotates in unison with shaft 12 and serves as a drive gear both for a second gear 168 which is keyed onto an end of the shaft 6 of blade roll 5 and for a third gear 169 which is keyed onto an end of the shaft 32 of blade roll 30. The gearing teeth relationship between gear 166 and gears 168 and 169 is proportional to the diameters of the anvil roll 10 and blade rolls 5 and 30 so that during rotation the peripheral surface speeds of the three rolls are substantially equal, although slight variations in speed can be tolerated without ill effect. A suitable safety shield (not shown) may be employed to enclose the gears 166, 168 and 169 to avoid injury to workers in the area.

Referring to FIG. 5, a scrap tire E has been shown therein, in plan, together with superimposed broken lines 170, which represent the cuts made in the scrap tire to form cut strips F (FIG. 2) during passage of the tire between blade roll 5 and anvil roll 10 of cutting assembly A, and superimposed broken lines 172, which represent the cuts made to the tire to form cut pieces G during the passage of the cut strips F between blade roll 30 and anvil roll 10 of cutting assembly A.

Figure 10:
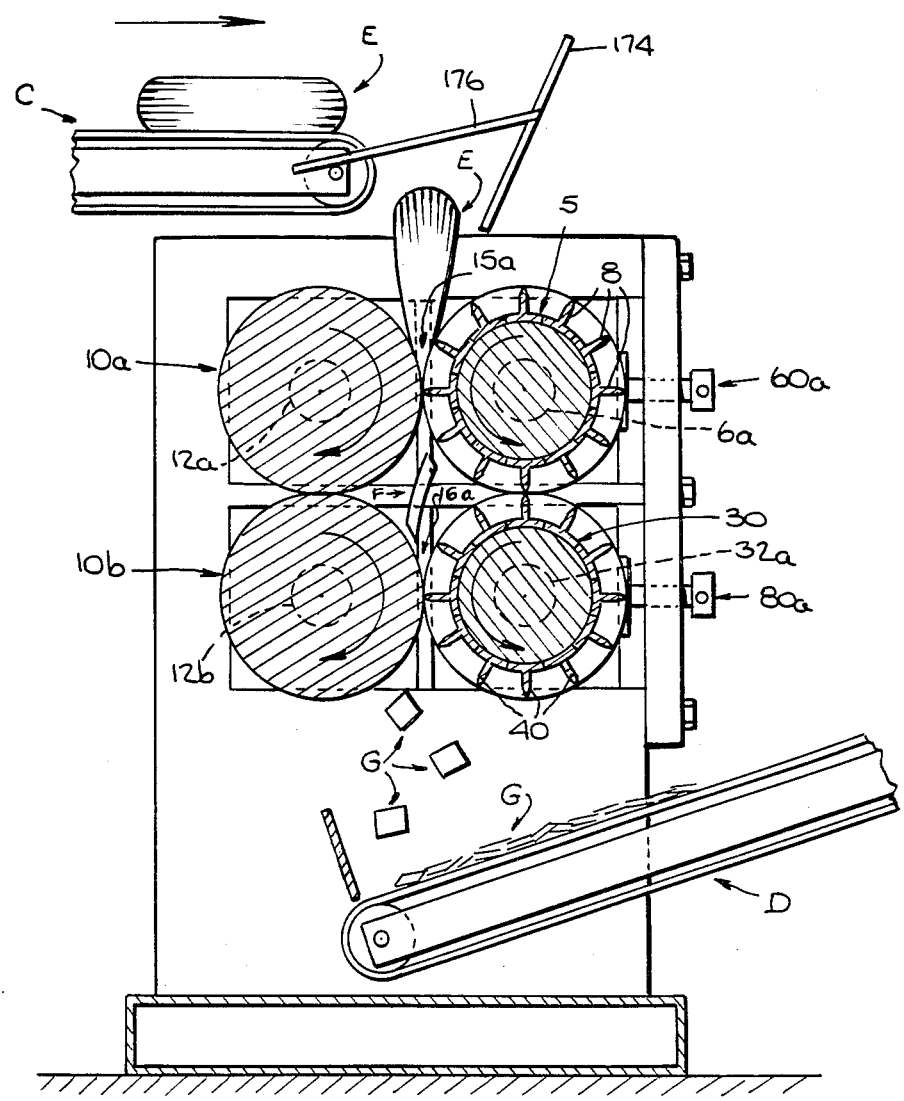

Referring now to FIGS. 9 and 10, an alternate embodiment of the invention has been illustrated in which two anvil rolls 10a, 10b are employed. Anvil roll 10a cooperates with blade roll 5 in cutting scrap tires E into large strips F of scrap tire, and anvil roll 10b cooperates with blade roll 30 in cutting the large strips F into small pieces G of scrap tire.

In this embodiment the first conveying means C delivers tires E to a point above the nip 15a between blade roll 5 and anvil roll 10a and the tires then drop vertically into the nip, guided by a guide plate 174 which is fastened by brackets 176 to the frame of conveying means C.

As in the embodiment of FIGS. 1-4, the second conveying means D is positioned below the nip 16a of anvil roll 10b and blade roll 30 to receive small pieces G of scrap tire from the cutting assembly A and to discharge them from the apparatus. Also, similar biasing means 60a, 62a for blade roll 5, and 80a, 82a for blade roll 30, are employed to press the respective thrust wheels 18, 20 and 56, 58 of the blade rolls into hard contact with the surfaces of respective anvil rolls 10a, 10b, maintaining predetermined positional relationships between the peripheral surfaces of the roller blades and the peripheral surfaces of the anvil rolls.

As best seen in FIG. 9, the helical roller blades 8 of blade roll 5 are at a 45° angle relative to the axis of blade roll 5 and are of one hand, while the helical roller blades 40 of blade roll 30 are at a 45° angle to the axis of blade roll 30 but are of opposite hand to, and complementary to, the roller blades of blade roll 5.

The driving means B, in the embodiment of FIGS. 9 and 10, includes a drive motor 152a the output shaft 154a of which drives the input shaft (not shown) of a reduction gear mechanism 160a which is provided with two output shafts 162a, 163. The output shafts 162a, 163 rotate at substantially equal angular speeds but in opposite directions. Shaft 162a is coupled by a coupling unit 164a to one end of the shaft 12a of anvil roll 10a, and shaft 163 is coupled by a coupling unit 165 to a corresponding end of the shaft 32a of blade roll 30.

Shaft 12a carries a gear 166a keyed thereto adjacent coupling unit 162a so that gear 166a rotates in unison with shaft 12a and serves as a drive gear for a second gear 168a which is keyed onto a corresponding end of the shaft 6a of blade roll 5. Similarly, shaft 32a of blade roll 30 carries a gear 169a keyed thereto at its opposite end from coupling unit 163 so that gear 169a rotates in unison with shaft 32a and serves as a drive gear for yet another gear 169b which is keyed onto a corresponding end of the shaft 12b of anvil roll 10b.

The gearing teeth relationships between gears 166a and 168a and between gears 169a and 169b are proportional to the diameters of anvil roll 10a and blade roll 5 and the diameters of anvil roll 10b and blade roll 30, respectively, so that during rotation the peripheral surface speeds of all four rolls are substantially equal, although slight variations in speed can be tolerated without ill effect. As before, suitable safety shields (not shown) may be employed to enclose the gears 166a, 168a and the gears 169a, 169b to avoid injury to workers in the area.

From the foregoing description, it will be seen that this invention provides a scrap tire cutting apparatus which, with low power demands, cuts scrap tires rapidly, cleanly and neatly into pieces of prescribed size range during a single pass of the tire through the apparatus. The invention provides for the use of roller blades which are highly effective and long-wearing and utilizes an arrangement which minimizes scoring of the anvil roll and damage to the blades. Moreover, the apparatus is capable of functioning properly and of cleanly cutting the tire sections notwithstanding a separation of several thousandths of an inch between the roller blades 8 and 40 and the surface of anvil roll 10 or the surfaces of anvil rolls 10a and 10b.

While there have been shown and described what are at present considered to be the preferred embodiments of this invention, it will be obvious to those skilled in the art that various changes and modifications may be made without departing from the broader aspects of this invention. It is, therefore, aimed in the appended claims to cover all such changes and modifications as fall within the true spirit and scope of this invention.

Having thus described the invention, what is claimed as new and desired to be protected by Letters Patent of the United States of America is:

1. Apparatus for cutting scrap tires, comprising;
   (A) a frame;
   (B) a cylindrical anvil roll mounted in said frame for rotation about its longitudinal axis;
   (C) a first blade roll mounted in said frame adjacent to said anvil roll for rotation about an axis parallel to the rotational axis of said anvil roll;
   (D) a plurality of roller blades fixed to said blade roll and rotatable therewith so that said blades and said anvil roll define a first nip therebetween into which tires to be cut can be drawn and cut up into strips, said roller blades circumscribing a corresponding cylinder of a predetermined diameter during rotation of said blade roll;
   (E) a second blade roll mounted in said frame adjacent to said anvil roll for rotation about an axis parallel to the rotational axis of said anvil roll;
   (F) a second plurality of roller blades fixed to said second blade roll and rotatable therewith so that said blades and said anvil roll define a second nip therebetween, angularly spaced from said first nip, into which said strips can be drawn and cut up into pieces of prescribed size said second plurality of roller blades circumscribing a corresponding cylinder of a predetermined diameter during rotation of said second blade roll;
   (G) drive means for rotating said anvil roll in one direction and said first and second blade rolls in an opposite direction to draw scrap tires into said first nip and to draw cut strips into second nip;
   (H) a first pair of axially spaced thrust wheels carried by said first blade roll and a second pair of axially spaced thrust wheels carried by said second blade roll,
      (1) the thrust wheels in each pair of thrust wheels being positioned outboard of the roller blades on the corresponding blade roll,
      (2) the thrust wheels in each pair of thrust wheels being at least equal in diameter to the predetermined diameter of the cylinder circumscribed by the peripheries of the roller blades on the corresponding blade roll; and
   (I) biasing means constructed and arranged to force said blade rolls relatively toward said anvil roll to bring the outer peripheries of said anvil roll and said thrust wheels into hard contact with one another, thereby to maintain predetermined positional relationships between the peripheral surfaces of the roller blades and the peripheral surface of the anvil roll notwithstanding the separating forces generated therebetween due to the movement therethrough of scrap tires and strips thereof being cut between such surfaces.

2. Apparatus as described in claim 1 wherein the roller blades on one of said blade rolls are oriented at a low angle relative to the axis of said blade roll and are of one hand, and the roller blades on the other of said blade rolls are oriented at a high angle relative to the axis of said blade roll and are of opposite hand.

3. Apparatus as described in claim 2 wherein said low angle is in the range of between 0° and less than 45° and wherein said high angle is in the range of between greater than 45° and 90°.

4. Apparatus as described in claim 1 wherein the roller blades on said first blade roll are oriented at about a 10° angle relative to the axis of said blade roll and the roller blades on said second blade roll are oriented at about a 90° angle relative to the axis of said blade roll.

5. Apparatus as described in claim 1 wherein the roller blades on one of said blade rolls are oriented at about a 45° angle relative to the axis of said blade roll and are of one hand, and the roller blades on the other of said blade rolls are oriented at about a 45° angle relative to the axis of said blade roll and are of opposite hand.

6. Apparatus as described in claim 1 wherein said first and second nips are angularly spaced about 90° apart.

7. Apparatus as described in claim 6 wherein said first blade roll is positioned generally above said anvil roll and said second blade roll is positioned generally alongside said anvil roll.

8. Apparatus as described in claim 7 wherein the axis of said first blade roll is positioned in a common vertical plane with the axis of said anvil roll and the axis of said second blade roll is positioned in a common horizontal plane with the axis of said anvil roll.

9. Apparatus as described in claim 1 wherein each of said roller blades includes a radially outer portion thereof which, in cross-section, is formed at least in part by inclined sides which form an included angle with each other of greater than 60° but less than 135°.

10. Apparatus as described in claim 9 wherein said inclined sides form an included angle with each other of about 90°.

11. Apparatus as described in claim 9 wherein said inclined sides are interconnected at their radially outer ends by a peripheral portion which is positioned radially inwardly of the apparent point of intersection of said inclined sides, the radially outermost portion of said peripheral portion having a diameter which is equal to said predetermined diameter.

12. Apparatus as described in claim 11 wherein said peripheral portion is in the form of a right cylinder coaxial with the rotational axis of the blade roll on which it is carried.

13. Apparatus as described in claim 12 wherein said right cylindrical peripheral portion has an axial length in the range of 3/64 in. to ¼ in.

14. Apparatus as described in claim 11 wherein said peripheral portion is arcuate in shape.

15. Apparatus as described in claim 1 wherein each of said roller blades includes a radially outer portion thereof which, in cross-section, is in the form of a pair of axially spaced, oppositely disposed, coaxial conic sections of substantially equal radius interconnected by an annular protrusion having an arcuate outer surface, the radially outermost portion of which outer surface has a diameter which is equal to said predetermined diameter.

16. Apparatus as described in claims 11 or 15 wherein the outer diameter of each of said thrust wheels is equal to the outer diameter of each of said roller blades.

17. Apparatus as described in claims 14 or 15 wherein the outer diameter of each of said thrust wheels exceeds said predetermined diameter of said roller blades by an amount in the range of from 0.001 in. to 0.003 in.

18. Apparatus for cutting scrap tires into generally rectangular pieces of predetermined size during a single pass of the tires through the apparatus, comprising:
(A) a frame;
(B) a first blade roll mounted in said frame for rotation about its longitudinal axis;
(C) a first plurality of roller blades fixed to said first blade roll and rotatable therewith, said roller blades being oriented at a low angle relative to the axis of said blade roll, said roller blades circumscribing a corresponding cylinder of a predetermined diameter during rotation of said first blade roll;
(D) a second blade roll mounted in said frame for rotation about an axis parallel to the axis of said first blade roll;
(E) a second plurality of roller blades fixed to said second blade roll and rotatable therewith, said roller blades being oriented at a high angle relative to the axis of said second blade roll, said second plurality of roller blades circumscribing a corresponding cylinder of a predetermined diameter during rotation of said second blade roll;
(F) anvil roll means rotatably carried by said frame adjacent to said blade rolls and cooperating therewith to form a first nip between said first blade roll and said anvil means and a second nip between said second blade roll and said anvil means; and,
(G) drive means for rotating said blade rolls and said anvil means to draw scrap tires into one of said nips for cutting the same into strips and to draw said strips into the other of said nips for cutting said strips into pieces;
(H) a first pair of axially spaced thrust wheels carried by said first blade roll and a second pair of axially spaced thrust wheels carried by said second blade roll,
 (1) the thrust wheels in each pair of thrust wheels being positioned outboard of the roller blades on the corresponding blade roll,
 (2) the thrust wheels in each pair of thrust wheels being at least equal in diameter to the predetermined diameter of the cylinder circumscribed by the peripheries of the roller blades on the corresponding blade roll; and
(I) biasing means constructed and arranged to force said blade rolls relatively toward said anvil means to bring the outer peripheries of said thrust wheels into hard contact with said anvil means, thereby to maintain predetermined positional relationships between the peripheral surfaces of the roller blades and the anvil means notwithstanding the separating forces generated therebetween due to the movement therethrough of scrap tires and strips thereof being cut between such surfaces.

19. Apparatus as described in claim 18 wherein said low angle is in the range of between 0° and less than 45° and is of one hand when greater than 0°, and wherein said high angle is in the range of between greater than 45° and 90° and is of opposite hand when less than 90°.

20. Apparatus as described in claim 18 wherein the roller blades on said first blade roll are oriented at about a 10° angle relative to the axis of said blade roll and the roller blades on said second blade roll are oriented at about a 90° angle relative to the axis of said blade roll.

21. Apparatus as described in claim 18 wherein said anvil roll means comprises first and second cylindrical anvil rolls mounted in said frame for rotation about corresponding longitudinal axes parallel to the rotational axes of said first and second blade rolls, said first anvil roll being positioned closely adjacent to said first blade roll and forming said first nip with said first blade roll, and said second anvil roll being positioned closely adjacent to said second blade roll and forming said second nip with said second blade roll.

22. Apparatus as described in claim 21 wherein said first nip is positioned generally above said second nip.

23. Apparatus as described in claim 20 wherein said first and second nips are in substantial vertical alignment.

24. Apparatus as described in claim 18 wherein said first blade angle is about 45° and of one hand, and said second blade angle is about 45° and of opposite hand.

25. Apparatus for cutting scrap tires into generally rectangular pieces of predetermined size during a single pass of the tires through the apparatus, comprising:

(A) a frame;

(B) a first blade roll mounted in said frame for rotation about its longitudinal axis;

(C) a first plurality of blades fixed to said first blade roll and rotatable therewith, said roller blades being oriented at a first angle relative to the axis of said first blade roll, said roller blades circumscribing a corresponding cylinder of a predetermined diameter during rotation of said blade roll;

(D) a second blade roll mounted in said frame for rotation about an axis parallel to the axis of said first blade roll;

(E) a second plurality of roller blades fixed to said second blade roll and rotatable therewith, said roller blades being oriented at a second angle relative to the axis of said second blade roll, said second angle being substantially complementary to said first angle, said second plurality of roller blades circumscribing a corresponding cylinder of a predetermined diameter during rotation of said second blade roll;

(F) anvil roll means rotatably carried by said frame adjacent to said blade rolls and cooperating therewith to form a first nip between said first blade roll and said anvil means and a second nip between said second blade roll and said anvil means;

(G) drive means for rotating said blade rolls and said anvil means to draw said strips into the other of said nips for cutting said strips into pieces;

(H) a first pair of axially spaced thrust wheels carried by said first blade roll and a second pair of axially spaced thrust wheels carried by said second blade roll, (1) the thrust wheels in each pair of thrust wheels being positioned outboard of the roller blades on the corresponding blade roll, (2) the thrust wheels in each pair of thrust wheels being at least equal in diameter to the predetermined diameter of the cylinder circumscribed by the peripheries of the roller blades on the corresponding blade roll; and (I) biasing means constructed and arranged to force said blade rolls relatively toward said anvil means to bring the outer peripheries of said thrust wheels into hard contact with said anvil means, thereby to maintain predetermined positional relationships between the peripheral surfaces of the roller blades and the anvil means notwithstanding the separating forces generated therebetween due to the movement therethrough of scrap tires and strips thereof being cut between such surfaces.

26. Apparatus as described in claim 25 wherein said first angle is in the range of between 0° and 45° and of one hand when greater than 0°, and wherein said second angle is in the range of between 45° and 90° and is of opposite hand when less than 90°.

27. Apparatus as described in claim 25 wherein said first angle is about 10° and said second angle is about 90°.

28. Apparatus as described in claim 25 wherein said first blade angle is about 45° and of one hand, and said second blade angle is about 45° and of opposite hand.

29. Apparatus as described in claim 25 wherein said anvil roll means comprises first and second cylindrical anvil rolls mounted in said frame for rotation about corresponding longitudinal axes parallel to the rotational axis of said first and second blade rolls, said first anvil being positioned closely adjacent to said first blade roll and forming said first nip with said first blade roll, and said second anvil roll being positioned closely adjacent to said second blade roll and forming said second nip with said second blade roll.

30. Apparatus as described in claim 29 wherein said first nip is positioned generally above said second nip.

31. Apparatus as described in claim 30 wherein said first and second nips are in substantial vertical alignment.

* * * * *